United States Patent [19]
Teach

[11] 3,759,951
[45] Sept. 18, 1973

[54] CARBANILATE DITHIOLANES AND DITHIANES

[75] Inventor: Eugene G. Teach, El Cerrito, Calif.

[73] Assignee: Stauffer Chemical Company, New York, N.Y.

[22] Filed: Oct. 26, 1971

[21] Appl. No.: 192,317

[52] U.S. Cl. .............................. 260/327 M, 71/90
[51] Int. Cl. ...................... C07d 71/00, C07d 73/00
[58] Field of Search .................. 260/327 M, 455 A, 260/471 C

[56] References Cited
UNITED STATES PATENTS
3,461,137  8/1969  Weil et al. ............................ 260/327

Primary Examiner—Henry R. Jiles
Assistant Examiner—Cecilia M. S. Jaisle
Attorney—Daniel C. Block et al.

[57] ABSTRACT

Substituted carbanilate dithiolanes and dithiane compounds having the formula

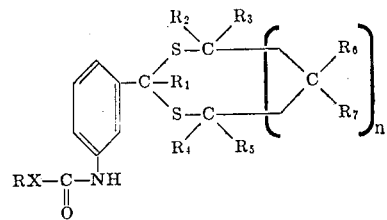

in which R is lower alkyl; $R_1$, $R_2$, $R_3$, $R_4$, $R_5$, $R_6$ and $R_7$ each are independently selected from the group consisting of hydrogen and lower alkyl; X is selected from the group consisting of oxygen and sulfur; and n is 0 or 1. These compounds are useful as herbicides.

13 Claims, No Drawings

2-PHENOXYALKANOIC ACID ESTERS

This application is a division of application Ser. No. 737,837 filed June 18, 1969.

The present invention relates to 2-phenoxyalkanoic acid esters. In particular, this invention concerns 2-phenoxyalkanoic acid alkoxyalkyl esters, 2-phenoxyalkanoic acid succinimido esters and 2-phenoxyalkanoic acid phthalimido esters which in standard and accepted pharmacological tests have demonstrated biological activity as serum cholesterol lowering agents.

The new and novel compounds within the scope of the present invention are exemplified by the following structural formula:

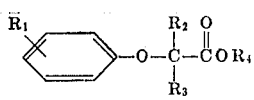

wherein $R_1$ is selected from the group consisting of hydrogen, halogen, lower alkyl and lower alkoxy; $R_2$ and $R_3$ are selected from the group consisting of hydrogen and lower alkyl; and $R_4$ is selected from the group consisting of lower alkoxy(lower)alkyl, succinimido and phthalimido. As employed herein the terms "lower alkyl", "lower alkoxy" and the like are meant to include both branched and straight chain moieties containing from one to eight carbon atoms. Typical examples of the compounds of this invention are: 2-(p-chlorophenoxy)-2-methylpropionic acid, methoxymethyl ester; 2-(p-chlorophenoxy)-2-methylpropionic acid, succinimido ester; 2-(p-bromophenoxy)-2-methylpropionic acid, succinimido ester; and 2-(p-chlorophenoxy)-2-methylpropionic acid, phthalimido ester.

The new and novel 2-phenoxyalkanoic acid, alkoxyalkyl esters of the present invention may be prepared by the process which is hereinafter schematically illustrated:

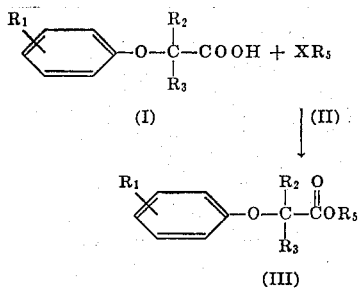

wherein $R_1$, $R_2$, and $R_3$ are defined as above and X is halogen and $R_5$ is lower alkoxy(lower)alkyl. The reaction is effected by admixing an appropriate 2-phenoxyalkanoic acid (X) with a haloalkyl alkylether (II), in the presence of a basic catalyst e.g. triethylamine, in ethyl acetate at about room temperature for a period of about one to about 20 hours.

When the reaction is complete, the resulting 2-phenoxyalkanoic acid alkoxyalkyl ester (III) is separated by conventional procedures. For example, the reaction mixture is filtered, washed with water and concentrated.

The new and novel succinimido and phthalimido esters of these 2-phenoxyalkanoic acids may be prepared by the process which is depicted as follows:

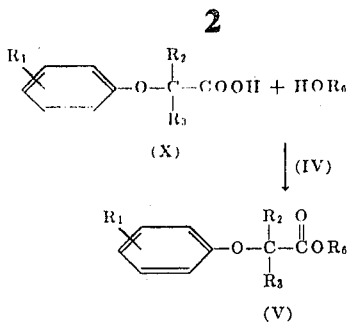

wherein $R_1$, $R_2$, and $R_3$ are defined as above and $R_6$ is succinimido or phthalimido. The reaction is effected by admixing an appropriate 2-phenoxyalkanoic acid (I) with a basic catalyst e.g. triethylamine, in a reaction-inert organic solvent at a temperature below about 0°C. An alkylhalocarbonate e.g. ethylchloroformate is then added to this mixture, the temperature is allowed to equilibrate to about room temperature and the mixture is diluted with ethyl ether. Thereafter, a N-hydroxy succinimide or phthalimide (IV) is added to the reaction mixture with stirring.

When the reaction is complete, the resulting 2-phenoxyalkanoic acid succinimido or phthalimido ester (V) is separated by conventional procedures. For example, the reaction mixture is extracted with an aqueous bicarbonate solution, water and then concentrated to afford the product (V) which can be recrystallized from a suitable solvent e.g. ethyl ether.

The 2-phenoxyalkanoic acid (I) starting materials employed in the above reactions may be prepared by procedures known in the art, for example, the process described by Galimberti, P. and Defranceschi, A. in Gazz. Chim. Ital, 77, 431 (1947) as exemplified in hereinafter Example I. The other reactants e.g. the haloalkyl alkylethers (II) and N-hydroxy succinimide or phthalimide (IV) employed in the above process are commercially available and/or may be prepared by well known chemical procedures. In the above reaction, by the term "reaction-inert organic" solvent is meant any organic solvent that will dissolve the reactants and not interfere with their interaction. Many such solvents will readily suggest themselves to those skilled in the art, e.g. ethyl acetate, chloroform, acetonitrile, dioxan and the like.

The new and novel 2-phenoxyalkanoic acid esters (III) and (V) of the present invention possess valuable pharmacological activity. In particular, these compounds in standard pharmacological procedures demonstrate an ability to reduce serum cholesterol and are useful as anticholesterol agents.

In the pharmacological evaluation of the cholesterol lowering properties of the compounds of this invention the in vivo effects of the compounds are tested as follows:

Male weanling rats are fed a hypercholesterolemic diet for three weeks. Serum cholesterol is determined on 0.01 ml of serum separated from tail blood collected in a capillary tube. Groups of rats with equal average serum cholesterol are given the test compound orally once a day by syringe for three days. Serum cholesterol is determined in the morning of the fourth day. Anticholesterol activity is demonstrated by a lowering of the serum cholesterol.

The 2-phenoxyalkanoic acid alkoxyalkyl esters (III), the 2-phenoxyalkanoic acid succinimido esters (V) and the 2-phenoxyalkanoic acid phthalimido esters (V) of to remove excess iron and iron oxides. The ethanol water solution was stripped to remove the ethanol and the liquid product was separated from the aqueous phase, diluted with methylene chloride, dried and the solvent stripped off. Obtained in this way was 197 g. of the title compound, $n_D^{30} = 1.6520$.

EXAMPLE IV

Preparation of 2(m-O-isopropylcarbamylphenyl)2-methyl-1,3-dithiolane

Twelve and seven-tenths grams (12.7 g.) of 2(m-aminophenyl)2-methyl-1,3-dithiolane was dissolved in 100 ml. of acetone with 6.5 g. of triethylamine and 7.4 g. of isopropyl chloroformate added portionwise with cooling. The mixture was poured into water, taken up in methylene chloride, dried and the solvent stripped under vacuum. There was obtained a yield of 15.2 g. of the title compound, an oil, $n_D^{30} = 1.6068$.

EXAMPLE V

Preparation of 2(m-S-methylthiocarbamylphenyl)1,3-dithiolane

Eleven and eight-tenths grams (11.8 g.) of 2(m-aminophenyl)1,3-dithiolane was dissolved in 100 ml. of acetone with 6.5 g. of triethylamine and 6.7 g. of methyl chlorothiolformate was added portionwise with cooling and stirring. The mixture was poured into water and the solid product collected and dried. There was obtained a yield of 15 g., m.p. 107°–109°C.

The following is a table of the compounds which are prepared according to the aforementioned procedures. Compound numbers have been assigned to them and are used for identification throughout the balance of the specification.

formulated into herbicidal compositions and applied as herein illustrated, are:

| R | X | $R_2$ | $R_3$ | $R_4$ | $R_5$ | $n$ | $R_6$ | $R_7$ |
|---|---|---|---|---|---|---|---|---|
| $C_2H_5$ | O | H | $CH_3$ | $CH_3$ | $CH_3$ | 0 | | |
| $t$-$C_4H_9$ | O | H | $CH_3$ | $CH_3$ | $CH_3$ | 0 | | |
| $C_2H_5$ | O | $CH_3$ | $CH_3$ | H | H | 0 | | |
| $t$-$C_4H_9$ | O | $CH_3$ | $CH_3$ | H | H | 0 | | |
| $C_2H_5$ | O | H | H | H | H | 1 | $CH_3$ | $CH_3$ |
| $t$-$C_4H_9$ | O | H | H | H | H | 1 | $CH_3$ | $CH_3$ |
| $C_3H_7C(CH_3)_2$ | O | H | H | H | H | 1 | $CH_3$ | $CH_3$ |
| $C_2H_5$ | O | H | $CH_3$ | $CH_3$ | H | 1 | H | H |
| $i$-$C_3H_7$ | O | H | $CH_3$ | $CH_3$ | H | 1 | H | H |
| $t$-$C_4H_9$ | O | H | $CH_3$ | $CH_3$ | H | 1 | H | H |
| $C_2H_5$ | O | H | $i$-$C_3H_7$ | H | H | 1 | $CH_3$ | $CH_3$ |
| $C_2H_5$ | S | H | $CH_3$ | $CH_3$ | $CH_3$ | 0 | | |
| $t$-$C_4H_9$ | S | H | $CH_3$ | $CH_3$ | $CH_3$ | 0 | | |
| $C_2H_5$ | S | $CH_3$ | $CH_3$ | H | H | 0 | | |
| $t$-$C_4H_9$ | S | $CH_3$ | $CH_3$ | H | H | 0 | | |
| $C_2H_5$ | S | H | H | H | H | 1 | $CH_3$ | $CH_3$ |
| $t$-$C_4H_9$ | S | H | H | H | H | 1 | $CH_3$ | $CH_3$ |
| $C_3H_7C(CH_3)_2$ | S | H | H | H | H | 1 | $CH_3$ | $CH_3$ |
| $C_2H_5$ | S | H | $CH_3$ | $CH_3$ | H | 1 | H | H |
| $i$-$C_3H_7$ | S | H | $CH_3$ | $CH_3$ | $CH_3$ | 1 | H | H |
| $t$-$C_4H_9$ | S | H | $CH_3$ | $CH_3$ | H | 1 | H | H |
| $C_2H_5$ | S | H | $i$-$C_3H_7$ | H | H | 1 | $CH_3$ | $CH_3$ |
| $i$-$C_3H_7$ | S | H | $i$-$C_3H_7$ | H | H | 1 | $CH_3$ | $CH_3$ |

HERBICIDAL SCREENING TESTS

As previously mentioned, the herein-described compounds produced in the above-described manner are phytotoxic compounds which are useful and valuable in controlling the growth of various plant species. Compounds of this invention are tested as herbicides in the following manner.

Pre-emergence herbicide test

On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20

TABLE I

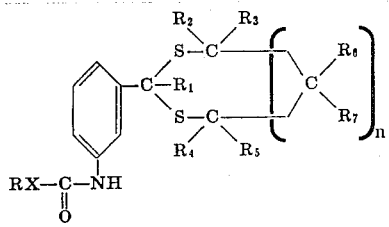

| Compound number | R | X | $R_1$ | $R_2$ | $R_3$ | $R_4$ | $R_5$ | $n$ | $R_6$ | $R_7$ | M.P., °C. or $n_D^{30}$ |
|---|---|---|---|---|---|---|---|---|---|---|---|
| 1 | $CH_3$ | O | $CH_3$ | H | H | H | H | 0 | | | 196–198 |
| 2 | $i$-$C_3H_7$ | O | $CH_3$ | H | H | H | H | 0 | | | 1.6068 |
| 3 | $CH_3$ | S | $CH_3$ | H | H | H | H | 0 | | | 1.6471 |
| 4 | $n$-$C_4H_9$ | S | $CH_3$ | H | H | H | H | 0 | | | 70–73 |
| 5 | $CH_3$ | S | H | H | H | H | H | 1 | H | H | 151–153 |
| 6 | $CH_3$ | S | H | H | H | H | H | 0 | | | 107–109 |
| 7 | $i$-$C_3H_7$ | O | H | H | H | H | H | 0 | | | 190–192 |

Other examples of compounds falling within the generic formula presented herein, which are preparable by the aforedescribed procedures and which may be to 50 seedlings per row, after emergence, depending on the size of the plants. The flats are watered after planting.

The spraying solution is prepared by dissolving 50 mg. of the test compound in 3 ml. of a solvent, such as acetone, water, alcohol or dimethylformamide, containing 1% Tween 20 (polyoxyethylene sorbitan monolaurate). When dimethylformamide is used, only 0.5 ml. or less is used to dissolve the compound. Another solvent is used to make the volume up to 3 ml. The following day after planting, each flat is sprayed at the rate of 20 pounds of the candidate compound per 143 gallons of solution per acre. An atomizer is used to spray the solution onto the soil surface. The flats are placed in a greenhouse at 70°–85°F. and watered regularly by sprinkling. Two weeks after treatment, the degree of weed control is determined by comparing the amount of germination and growth of each weed in the treated flats with weeds in several untreated control flats. The rating system is as follows:

0 = no significant injury (approximately 0–10 per cent control)

3 = slight injury (approximately 10–40 per cent control)

6 = moderate injury (approximately 40–70 per cent control)

9 = severe injury or death (approximately 70–100 per cent control)

An activity index is used to represent the total activity on all seven weed species. The activity index is the sum of the numbers divided by 3, so that an activity index of 21 represents complete control of all seven weeds. The results of this test are reported in Table II.

Post-emergence herbicide test

Seeds of five weed species, including hairy crabgrass, watergrass, California red oats, Indian mustard, and curly dock and one crop, pinto beans (*Phaseolus vulgaris*), are planted in flats as described above for pre-emergence screening. The flats are placed in the greenhouse at 72°–85°F. and watered daily with a sprinkler. About 10 to 14 days after planting, when the primary leaves of the bean plant are almost fully expanded and the first trifoliate leaves are just starting to form, the plants are sprayed. The spray is prepared by weighing out 50 mg. of the test compound, dissolving it is 5 ml. of acetone containing 1 percent Tween 20 (polyoxyethylene sorbitan monolaurate) and then adding 5 ml. of water. The solution is sprayed on the foliage using an atomizer. The spray concentration is 0.5 percent and the rate would be approximately 20 lb/acre if all of the spray were retained on the plant and the soil, but some spray is lost so it is estimated that the application rate is approximately 12.5 lb/acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose taking care not to wet the foliage.

Injury rates are recorded 14 days after treatment. The rating system is the same as described above for the pre-emergence test where (0), (3), (6), and (9) are used for the different rates of injury and control. The injury sumptoms are also recorded. The maximum activity index for complete control of all the species in the post-emergence screening test is 18. This index represents the sum of the rating numbers obtained with the six plant species used in the test divided by 3. The herbicide activity index is shown in Table II.

TABLE II

HERBICIDAL ACTIVITY SCREENING RESULTS

| COMPOUND NUMBER | HERBICIDAL ACTIVITY INDEX** | |
|---|---|---|
| | Pre-emergence (20 lb/A) | Post-emergence (12.5 lb/A) |
| 1 | 3 | 1 |
| 2 | 3 | 8 |
| 3 | 5 | 8 |
| 4 | 0 | 1 |
| 5 | 0 | 6 |
| 6 | 5 | 8 |
| 7 | 0 | 4 |

** 21 = 70–100% control of all seven plant species tested pre-emergence.
18 = 70–100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like, in the form and manner required. The mixtures can be dispersed in water with the aid of a wetting agent or they can be employed in organic liquid compositions, oil and water, water in oil emulsions, with or without the addition of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compound described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least ½ inch below the soil surface. It is not necessary that the phytotoxic compositions be admixed with the soil particles and these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include, for example, 2,4-dichlorophenoxyacetic acids, 2,4,5-trichlorophenoxyacetic acid, 2-methyl-4-chlorophenoxyacetic acid and the salts, esters and amides thereof; triazine derivatives, such as 2,4-bis(3-methoxypropylamino)-6-methyl-thio-S-triazine; 2-chloro-4-ethylamino-6-isopropylamino-S-triazine, and 2-ethylamino-4-isopropylamino-6-methylmercapto-S-triazine, urea derivatives, such as 3-(3,4-dichlorophenyl)-1,1-dimethyl urea and 3-(p-chlorophenyl-1,1-dimethyl urea and acetamides such as N,N-diallyl-α-chloroacetamide, N-(α-chloroacetyl)hexamethylene imine, and N,N-diethyl-α-bromacetamide, and the like; benzoic acids such as 3-amino-2,5-dichlorobenzoic; and thiocarbamates, such as S-propyl dipropylthiocarbamate; S-ethyldipropylthiocarbamate, S-ethylcyclohexyl-ethylthiocarbamate, S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A compound having the formula

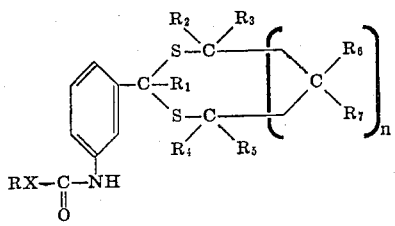

in which R is lower alkyl; $R_1$, $R_2$, $R_3$, $R_4$, $R_5$, $R_6$ and $R_7$ each are independently selected from the group consisting of hydrogen and lower alkyl; X is selected from the group consisting of oxygen and sulfur; and n is 0 or 1.

2. A compound according to claim 1 in which R is lower alkyl, X is oxygen, $R_1$ is lower alkyl and $R_2$, $R_3$, $R_4$ and $R_5$ are each independently hydrogen and n is 0.

3. A compound according to claim 2 in which R is methyl and $R_1$ is methyl.

4. A compound according to claim 2 in which R is isopropyl and $R_1$ is methyl.

5. A compound according to claim 1 in which R is lower alkyl, X is sulfur, $R_1$ is lower alkyl and $R_2$, $R_3$, $R_4$ and $R_5$ are each independently hydrogen and n is 0.

6. A compound according to claim 5 in which R is methyl and $R_1$ is methyl.

7. A compound according to claim 5 in which R is n-butyl and $R_1$ is methyl.

8. A compound according to claim 1 in which R is lower alkyl, X is sulfur, $R_1$, $R_2$, $R_3$, $R_4$ and $R_5$ are each independently hydrogen, n is 1 and $R_6$ and $R_7$ are each hydrogen.

9. A compound according to claim 8 in which R is methyl.

10. A compound according to claim 1 in which R is lower alkyl, X is sulfur, $R_1$, $R_2$, $R_3$, $R_4$ and $R_5$ are each independently hydrogen and n is 0.

11. A compound according to claim 10 in which R is methyl.

12. A compound according to claim 1 in which R is lower alkyl, X is oxygen, $R_1$, $R_2$, $R_3$, $R_4$ and $R_5$ are each independently hydrogen, and n is 0.

13. A compound according to claim 12 in which R is isopropyl.

* * * * *

UNITED STATES PATENT OFFICE
CERTIFICATE OF CORRECTION

Patent No. 3,759,951          Dated September 18, 1973

Inventor(s) Eugene G. Teach

It is certified that error appears in the above-identified patent and that said Letters Patent are hereby corrected as shown below:

Cancel columns 1 and 2 of the printed patent and substitute the attached columns 1 and 2.

Signed and sealed this 30th day of April 1974.

(SEAL)
Attest:

EDWARD M. FLETCHER, JR.          C. MARSHALL DANN
Attesting Officer                Commissioner of Patents

CARBANILATE DITHIOLANES AND DITHIANES

This invention relates to certain novel substituted carbanilate dithiolanes and dithianes which are useful as herbicides. The compounds of the present invention are new compositions of matter and correspond to the formula

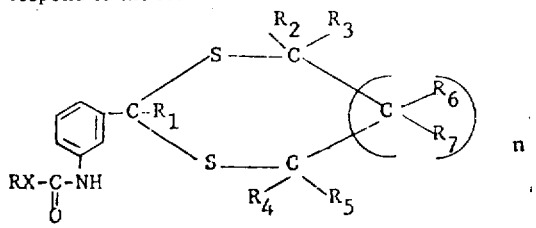

in which R is lower alkyl; $R_1$, $R_2$, $R_3$, $R_4$, $R_5$, $R_6$ and $R_7$ each are independently selected from the group consisting of hydrogen and lower alkyl; X is selected from the group consisting of oxygen and sulfur; and n is 0 or 1.

In the above description, the following preferred embodiments are intended for the various substituents: Lower alkyl preferably includes, unless otherwise provided for, those members which contain from 1 to 6 carbon atoms, inclusive, in both straight chain and branched chain configurations, for example, methyl, ethyl, n-propyl, isopropyl, n-butyl, isobutyl, tertiary-butyl, n-pentyl, isopentyl, neopentyl, hexyl, isohexyl, and the like.

The compounds of this invention have been found to be active herbicides of a general type. That is, certain members of the class have been found to be herbicidally effective against a wide range of plant species. A method of controlling undesirable vegetation of the present invention comprises applying an herbicidally effective amount of the above-described compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinant seeds, emerging seedlings, and established vegetation, including the roots and above-ground portions.

The compounds of the present invention are prepared by several different methods, depending upon the nature of the starting materials and products desired. Synthesis of the starting materials can be found in several references in the literature. The following method is illustrative: Meta-nitrobenzaldehyde (wherein $R_1$, supra, is hydrogen), or meta-nitroacetophenone or higher phenones (wherein $R_1$, supra, is lower alkyl), are reacted with a suitable dithiol, either a 1,2 or 1,3-dithiol to give the desired cyclic mercaptal. The corresponding cyclic mercaptal is reduced by conventional methods to give the corresponding meta-amino compound. The meta-amino compound is reacted with an appropriate acyl halide to obtain the desired substituted anilide, dithiolane or dithiane.

Particularly more illustrative of the above generally described method will be the following specific examples. Following the examples is a table of compounds which are prepared according to the procedures described and illustrated herein.

EXAMPLE I

Preparation of Intermediates
2(m-nitrophenyl)1,3-dithiane

One hundred and six-tenths grams (100.6 g.) of m-nitro benzaldehyde, 72.4 g. of 1,3-propanedithiol and 1 g. of p-toluene sulfonic acid were combined in 200 ml. of benzene and heated to reflux under a modified Dean-Stark apparatus. The mixture was heated until no more water came off (approximately 12 ml) and then cooled and the product crystallized. There was obtained a yield of 149 g. of the title compound, M.P. 112°–114°C.

2(m-aminophenyl)1,3-dithiane

One hundred grams (100 g.) of iron powder was stirred with 250 ml. of ethanol and 200 ml. of water. 7 ml. of concentrated hydrochloric acid was added, and the mixture heated to reflux. One hundred and forty-one grams (141 g.) of 2(m-nitrophenyl)1,3-dithiane was added portionwise to maintain reflux. When addition was complete and the mixture had cooled about 10° below reflux, 7 g. of 50% sodium hydrate was added, the mixture filtered through a dicalite pad to remove excess iron and iron oxide and the ethanol solution was removed under vacuum. There was obtained 112.8 g. of the title compound, M.P. 139°–142°C.

EXAMPLE II

Preparation of 2(m-S-methylthiocarbamylphenyl)1,3-dithiane

Twelve and seven-tenths grams (12.7 g.) of 2(m-amino phenyl)1,3-dithiane was dissolved in 100 ml. of acetone with 6.5 g. of triethylamine and 6.7 g. of methyl chlorothiol formate was added portionwise with cooling and stirring. The mixture was poured into water and the solid product collected by filtration and dried. There was obtained a yield of 13.8 g. of the title compound, M.P. 129°–151°C. The product was triturated with diethyl ether to give a product, M.P. 151°–153°C.

EXAMPLE III

Preparation of Intermediates
2(m-nitrophenyl)2-methyl-1,3-dithiolane

One hundred and seventy-five grams (175 g.) of m-nitro acetophenone, 100 g. of ethane dithiol and 1 g. of p-toluene sulfonic acid were combined in 300 ml. of benzene and heated to reflux under a modified Dean-Stark apparatus to remove water. The mixture was heated at reflux for about 24 hours until no more water came off. The benzene was removed under vacuum in a rotary evaporator. There was obtained 257 g. of the title compound, an oil, $n_D^{30} = 1.6255$.

2(m-aminophenyl)2-methyl-1,3-dithiolane

One hundred and eighty grams (180 g.) of iron powder, 375 ml. of ethyl alcohol and 300 ml. of water and 12 ml. of concentrated hydrochloride acid were stirred together and heated to reflux. Two hundred and fifty-two grams (252 g.) of 2(m-nitrophenyl)2-methyl-1,3-dithiolane was added dropwise to maintain reflux. When the addition was complete and the mixture cooled about 10°, 12 g. of 50% sodium hydroxide was added and the mixture filtered through a dicalite pad